(12) United States Patent
Yueh et al.

(10) Patent No.: US 11,747,645 B2
(45) Date of Patent: *Sep. 5, 2023

(54) DISPLAY DEVICE

(71) Applicant: Innolux Corporation, Miao-Li County (TW)

(72) Inventors: Jui-Jen Yueh, Miao-Li County (TW); Tsung-Han Tsai, Miao-Li County (TW); Kuan-Feng Lee, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,617

(22) Filed: Aug. 9, 2022

(65) Prior Publication Data

US 2023/0081246 A1 Mar. 16, 2023

(30) Foreign Application Priority Data

Sep. 15, 2021 (CN) .......................... 202111078793.5

(51) Int. Cl.
*G02B 30/29* (2020.01)
*G02B 30/32* (2020.01)
(Continued)

(52) U.S. Cl.
CPC ............. *G02B 30/29* (2020.01); *G02B 30/28* (2020.01); *G02B 30/31* (2020.01); *G02B 30/32* (2020.01)

(58) Field of Classification Search
CPC ........ G02B 30/29; G02B 30/28; G02B 30/31; G02B 30/32; H04N 13/00; H04N 13/32; H04N 13/302; H04N 13/349
See application file for complete search history.

(56) References Cited

U.S. PATENT DOCUMENTS

2012/0249530 A1* 10/2012 Fukushima ............ G02B 30/27
345/419
2013/0335463 A1* 12/2013 Chiang ................ H04N 13/356
345/697

(Continued)

FOREIGN PATENT DOCUMENTS

| CN | 102822724 | 12/2012 |
|----|-----------|---------|
| CN | 106550231 | 3/2017 |
| WO | 2020167374 | 8/2020 |

OTHER PUBLICATIONS

"Search Report of Europe Counterpart Application", dated Feb. 10, 2023, p. 1-p. 7.

(Continued)

*Primary Examiner* — Jonathan Y Jung
(74) *Attorney, Agent, or Firm* — JCIPRNET

(57) ABSTRACT

A display device, including a display panel, a stereoscopic structure, and a light control structure, is provided. The stereoscopic structure is disposed on the display panel, wherein the stereoscopic structure includes multiple stereoscopic units, and the stereoscopic units extend in a first direction. The light control structure is disposed between the display panel and the stereoscopic structure, wherein the light control structure includes multiple light control units, and the light control units extend in a second direction. An included angle between the first direction and the second direction is greater than 0 degrees and less than 180 degrees.

13 Claims, 8 Drawing Sheets

(51) Int. Cl.
  *G02B 30/31*  (2020.01)
  *G02B 30/28*  (2020.01)

(56) References Cited

U.S. PATENT DOCUMENTS

| | | | | |
|---|---|---|---|---|
| 2015/0271482 | A1* | 9/2015 | Chen | G02B 6/0043 |
| | | | | 349/65 |
| 2015/0341623 | A1* | 11/2015 | Kim | G02B 30/27 |
| | | | | 348/59 |
| 2017/0085865 | A1* | 3/2017 | Sumi | H04N 13/305 |
| 2018/0120639 | A1* | 5/2018 | Shih | G02F 1/133603 |
| 2019/0265492 | A1* | 8/2019 | Yuuki | H04N 13/31 |
| 2019/0377177 | A1 | 12/2019 | Takahashi et al. | |
| 2021/0072428 | A1 | 3/2021 | Huang et al. | |
| 2021/0072555 | A1* | 3/2021 | Kim | H10K 50/86 |
| 2021/0274153 | A1* | 9/2021 | Cho | G02B 30/29 |

OTHER PUBLICATIONS

"Office Action of Taiwan Counterpart Application", dated Jun. 28, 2023, p. 1-p. 9.

* cited by examiner

DISPLAY DEVICE

CROSS-REFERENCE TO RELATED APPLICATION

This application claims the priority benefit of China application serial no. 202111078793.5, filed on Sep. 15, 2021. The entirety of the above-mentioned patent application is hereby incorporated by reference herein and made a part of this specification.

BACKGROUND

Technical Field

The disclosure relates to an electronic device, and more particularly to a display device.

Description of Related Art

When the vehicle manufacturer applies the stereoscopic display technology to the dashboard display device, the large-angle light beam output by the display panel may be reflected by the windshield to become stray light and be transmitted to the eyes of the driver. Such stray light may affect the quality of a stereoscopic image. Therefore, improving the influence of stray light on the stereoscopic image is one of the issues that the research and development personnel urgently intend to solve currently.

SUMMARY

The disclosure provides a display device, which can improve the issue of stray light.

According to an embodiment of the disclosure, a display device includes a display panel, a stereoscopic structure, and a light control structure. The stereoscopic structure is disposed on the display panel. The stereoscopic structure includes multiple stereoscopic units, and the stereoscopic units extend in a first direction. The light control structure is disposed between the display panel and the stereoscopic structure. The light control structure includes multiple light control units, and the light control units extend in a second direction. An included angle between the first direction and the second direction is greater than 0 degrees and less than 180 degrees.

In order for the features and advantages of the disclosure to be more comprehensible, the following specific embodiments are described in detail in conjunction with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
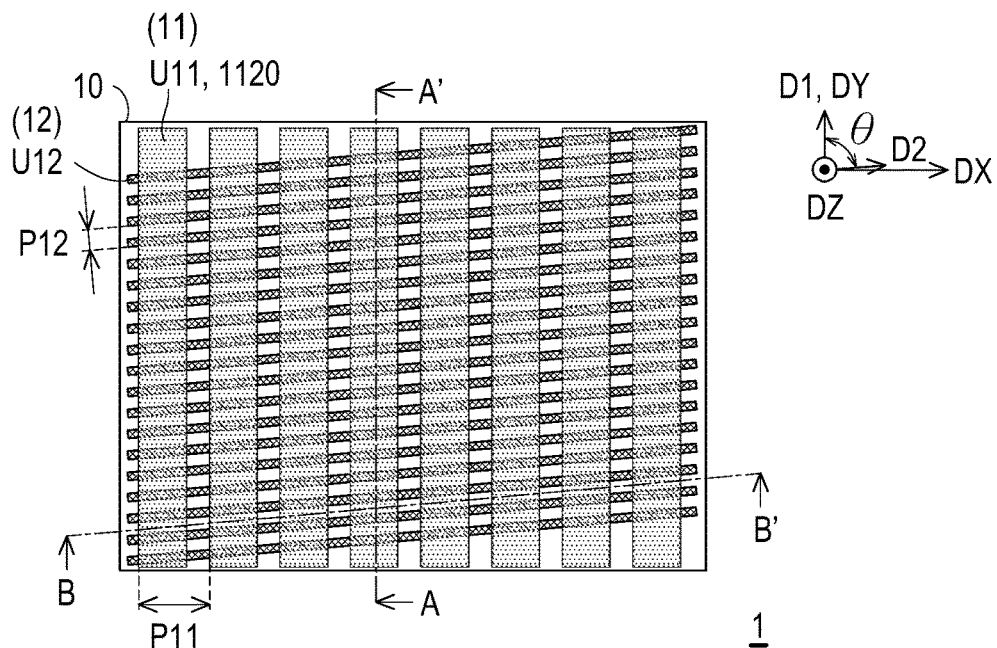
FIG. 1A is a top schematic view of a display device according to some embodiments of the disclosure.
Figure 1B:
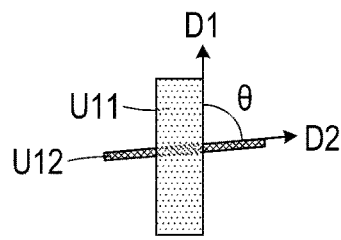
FIG. 1B is a partial schematic view of a stereoscopic unit and a light control unit in FIG. 1A.

The disclosure may be understood by referring to the following detailed description in conjunction with the accompanying drawings. It should be noted that in order to facilitate the understanding by the reader and the conciseness of the drawings, multiple drawings in the disclosure only depict a portion of the electronic device/display device, and specific elements in the drawings are not drawn according to actual scale. In addition, the number and size of each element in the drawings are only for illustration and are not intended to limit the scope of the disclosure. For example, for the sake of clarity, the relative size, thickness, and position of each film, region, or structure may be reduced or enlarged.

Throughout the disclosure and the appended claims, certain words are used to refer to specific elements. Persons skilled in the art should understand that electronic device manufacturers may refer to the same elements by different names. The disclosure does not intend to distinguish the elements with the same function but different names. In the following description and claims, words such as "having" and "including" are open-ended words, which should be interpreted as "including but not limited to . . . ".

Directional terms such as "upper", "lower", "front", "rear", "left", and "right" mentioned in the disclosure only indicate directions with reference to the drawings. Therefore, the used directional terms are used to illustrate, but not to limit, the disclosure. It should be understood that when an element or a film is referred to as being "on" or "connected to" another element or film, the element or film may be directly on the another element or film or directly connected to the another element or film, or there may be an element or a film inserted between the two (indirect case). Conversely, when an element or a film is referred to as being "directly on" or "directly connected to" another element or film, there is no element or film inserted between the two.

The terms "approximately", "equal to", "equivalent", "same", "substantially", or "roughly" mentioned in the disclosure usually represent falling within a 10% range of a given value or represent falling within a 5%, 3%, 2%, 1%, or 0.5% range of a given value. In addition, unless specifically defined, the terms "a given range is from a first value to a second value" and "a given range falls within a range of a first value to a second value" represent that the given range includes the first value, the second value, and other values therebetween.

In some embodiments of the disclosure, unless specifically defined, terms related to bonding and connection, such as "connection" and "interconnection", may mean that two structures are in direct contact or may also mean that two structures are not in direct contact and there is another structure disposed between the two structures. The terms related to bonding and connection may also include the case where the two structures are both movable or both fixed. In addition, the terms "electrical connection" and "coupling" include any direct and indirect electrical connection means.

In the embodiments shown in the drawings, the same or similar elements adopt the same or similar reference numerals, and redundant descriptions thereof are omitted. In addition, features in different embodiments may be arbitrarily mixed and matched as long as the spirit of the invention is not violated or there is no conflict, and simple equivalent changes and modifications made in accordance with the specification or claims are all still within the scope of the disclosure. In addition, terms such as "first" and "second" mentioned in the specification or claims are only used to name different elements or to distinguish different embodiments or ranges, and are not used to limit the upper or lower limit of the number of elements or to limit the manufacturing sequence or configuration sequence of the elements.

An electronic device of the disclosure may include a display device, a light emitting device, or a splicing device, but not limited thereto. The electronic device may include a bendable or flexible electronic device. The following will take the display device as an example to illustrate the content of the disclosure, but the disclosure is not limited thereto.

The display device of the disclosure may be any type of display device, such as a self-luminous display device or a non-self-luminous display device. The self-luminous display device may include a light emitting diode, a light conversion layer, other suitable materials, or a combination of the above, but not limited thereto. The light emitting diode may include, for example, an organic light emitting diode (OLED), a mini LED, a micro LED, or a quantum dot LED (QLED or QDLED), but not limited thereto. The light conversion layer may include a wavelength conversion material and/or a light filter material, and the light conversion layer may include, for example, fluorescence, phosphor, quantum dot (QD), other suitable materials, or a combination of the above, but not limited thereto. The non-self-luminous display device may include a liquid crystal display device, but not limited thereto.

Please refer to FIG. 1A to FIG. 1D. A display device 1 may include a display panel 10, a stereoscopic structure 11, and a light control structure 12, but not limited thereto. As shown in FIG. 1A, edges of the display panel 10 may respectively extend along directions DX and DY, wherein the direction DX and the direction DY are perpendicular to each other, but the disclosure is not limited thereto. The display panel 10 may include a self-luminous display panel or a non-self-luminous display panel. The self-luminous display panel and the non-self-luminous display panel may be as described above, which will not be repeated here. When the non-self-luminous display panel is used as the display panel 10, the display device 1 may further include a backlight module (not shown) to provide a light source required for display. The drawings of the disclosure use the self-luminous display panel as the display panel 10 to illustrate the content of the disclosure, but the disclosure is not limited thereto.

For example, the display panel 10 may include a driving substrate 100 and multiple pixels 102, but not limited thereto. The driving substrate 100 may include a printed circuit board, a flexible printed circuit board, a glass substrate formed with a circuit thereon, a flexible substrate formed with a circuit thereon, etc., but not limited thereto. The driving substrate 100 has a first top surface ST1 adjacent to an element or a film. For example, when the display panel is the self-luminous display panel including a light emitting diode, the first top surface ST1 of the driving substrate 100 may be, for example, a top surface of an electrode connected to the light emitting diode. When the display panel is the non-self-luminous display panel such as a liquid crystal panel, the driving substrate 100 may have multiple films including a liquid crystal alignment layer. In this case, the first top surface ST1 may be a top surface of a topmost film.

The pixels 102 are disposed on the driving substrate 100. Taking the self-luminous display panel as an example, the pixels 102 may include multiple light emitting diodes 1020 disposed on the first top surface ST1, but not limited thereto. In some embodiments, although not shown, the light emitting diodes 1020 may include multiple red light emitting diodes, multiple green light emitting diodes, and multiple blue light emitting diodes, but not limited thereto. In other embodiments, although not shown, the light emitting diodes 1020 may include the blue light emitting diodes, and part of the blue light emitting diodes may be covered with a color conversion layer to convert blue light into red light or green light, but not limited thereto. The material of the color conversion layer may include fluorescence, phosphorescence, quantum dot, other suitable materials, or a combination of the above, but not limited thereto. In some embodiments, the display panel 10 may further include an insulating layer 104. The insulating layer 104 covers the light emitting diodes 1020. The material of the insulating layer 104 may include a transparent material, a water and oxygen blocking material, other suitable materials, or a combination of the above, but not limited thereto. For example, the material of the insulating layer 104 may include epoxy, acrylic-based resin, silicone, polyimide polymer, or a combination of the above, but not limited thereto.

Figure 8A:
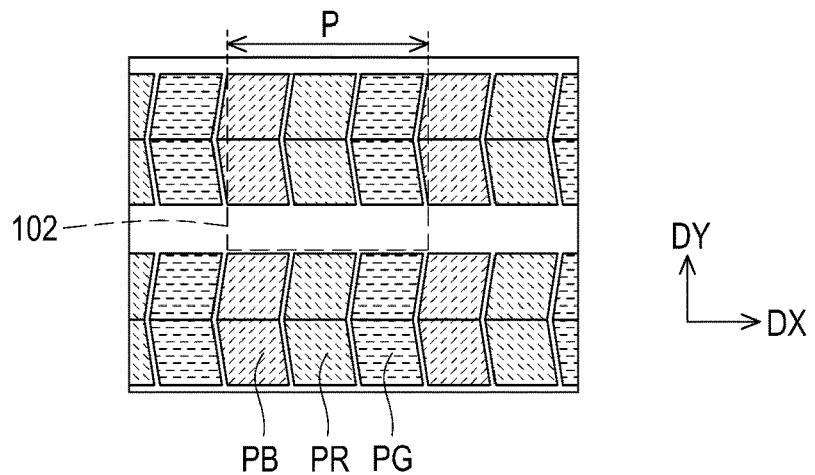
FIG. 8A to FIG. 8C respectively show three types of pixel structures.
Figure 8B:
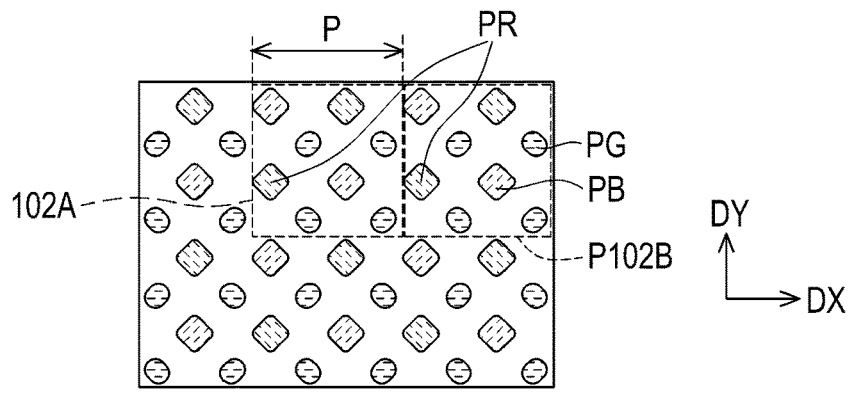
Figure 8C:
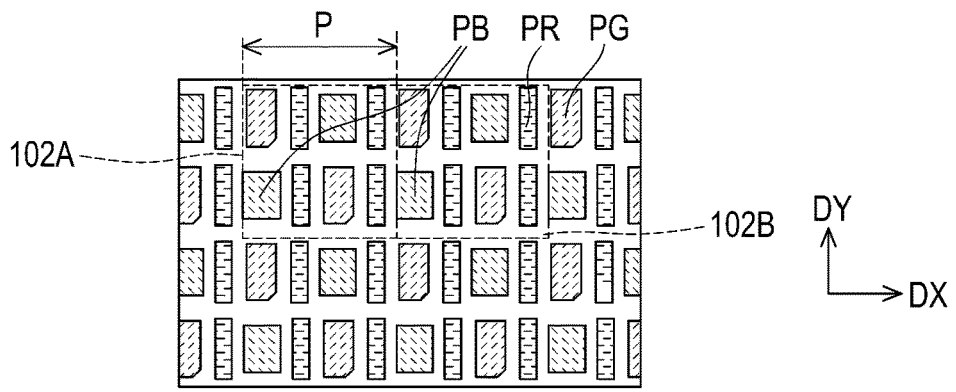

Taking the non-self-luminous display panel (for example, the liquid crystal panel) as an example, as shown in FIG. 8A to FIG. 8C, each pixel 102 may include one or more red subpixels PR, one or more green subpixels PG, and one or more blue subpixels PB, but not limited thereto. Although not shown, each subpixel may include, but is not limited to, a liquid crystal material, a common electrode, and one or more pixel electrodes. Although not shown, the non-self-luminous display panel may also include a liquid crystal layer and a color filter substrate. The color filter substrate and the driving substrate 100 are oppositely disposed, the liquid crystal layer is disposed between the color filter substrate and the driving substrate 100, and the color filter substrate is disposed between the driving substrate 100 and the light control structure 12. The color filter substrate may include multiple filter patterns disposed corresponding to the subpixels, and the filter patterns may include multiple red filter patterns, multiple green filter patterns, and multiple blue filter patterns, but not limited thereto.

The stereoscopic structure 11 is disposed on the display panel 10. The stereoscopic structure 11 is used to guide image beams with parallax to different positions (for example, positions of the left and right eyes), so that the user can view an image with stereoscopic effect.

The stereoscopic structure 11 may include a passive stereoscopic structure or an active stereoscopic structure. Taking the passive stereoscopic structure as an example, although not shown, the stereoscopic structure 11 may include a lenticular structure or a barrier structure. The lenticular structure may include multiple lenses, such as multiple cylindrical lenses. The barrier structure may include multiple black patterns, such as multiple black stripes.

Figure 1C:
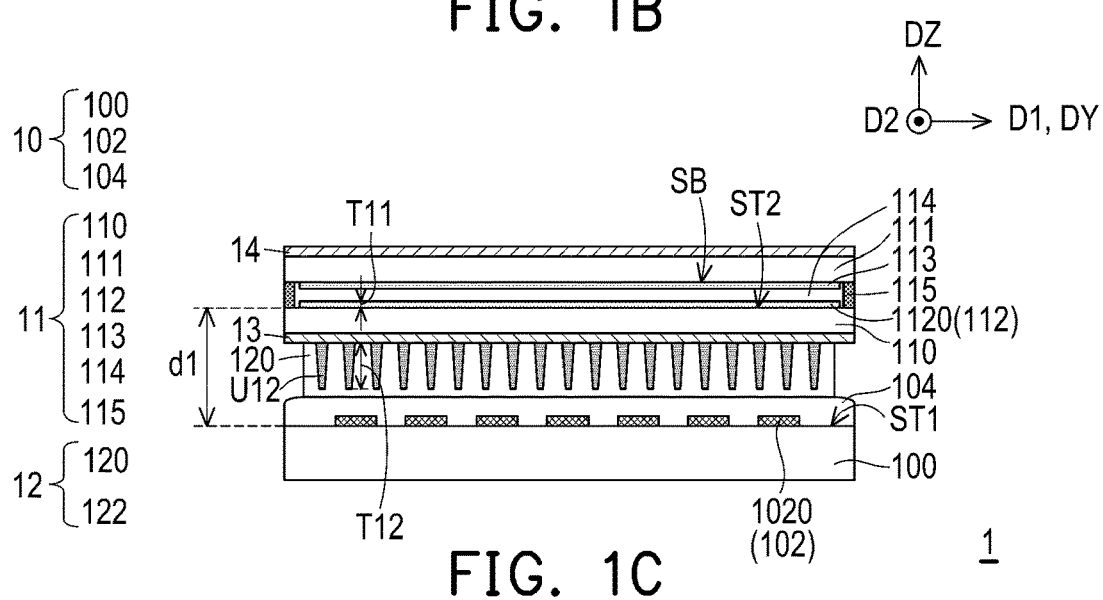
FIG. 1C and FIG. 1D are respectively cross-sectional schematic views taken along a section line A-A' and a section line B-B' in FIG. 1A.

Taking the active stereoscopic structure as an example, please refer to FIG. 1C. The stereoscopic structure 11 may include a substrate 110, a substrate 111, an electrode layer 112, an electrode layer 113, a liquid crystal layer 114, and a sealing member 115, but not limited thereto. The substrate 110 and the substrate 111 are oppositely disposed, wherein the substrate 110 is located between the substrate 111 and the display panel 10. The substrate 110 and the substrate 111 may be flexible or rigid substrates, and the materials thereof may include plastic or glass, but not limited thereto. The electrode layer 112 and the electrode layer 113 are respectively disposed on the substrate 110 and the substrate 111, wherein the electrode layer 112 is located between the liquid crystal layer 114 and the substrate 110, and the electrode layer 113 is located between the liquid crystal layer 114 and the substrate 111. The materials of the electrode layer 112 and the electrode layer 113 may include light transmitting conductive materials, such as metal oxide, metal mesh, or graphene, but not limited thereto. The metal oxide may include ITO, IZO, IGZO, AZO, etc., but not limited thereto. One of the electrode layer 112 and the electrode layer 113 may be a full-surface electrode layer (for example, as a common electrode layer), and the other one of the electrode layer 112 and the electrode layer 113 may be a patterned electrode layer. For example, the electrode layer 113 is the full-surface electrode layer, and the electrode layer 112 is the patterned electrode layer and includes multiple electrode patterns 1120, but not limited thereto. Multiple liquid crystal molecules in the liquid crystal layer 114 are controlled through the potential difference between the electrode layer 112 and the electrode layer 113. The stereoscopic structure 11 can achieve the effect similar to the lenticular structure or the barrier structure. The sealing member 115 is disposed between the substrate 110 and the substrate 111 and seals the liquid crystal layer 114 in a space formed by the substrate 110 and the substrate 111 and the sealing member 115.

The stereoscopic structure 11 includes multiple stereoscopic units U11, and the stereoscopic units U11 extend in a direction D1. The stereoscopic units U11 are repetitive units in the stereoscopic structure 11. For example, the stereoscopic units U11 may be the lenses in the lenticular structure, the black patterns in the barrier structure, or electrodes (for example, the patterned electrode patterns 1120) for driving the liquid crystal molecules in the active stereoscopic structure, but not limited thereto. When the stereoscopic unit U11 is the lens in the lenticular structure, an extension direction of the stereoscopic unit U11 (for example, the direction D1) may be defined by an extension direction of a trough T (refer to FIG. 7B) of the lens in the lenticular structure. When the stereoscopic unit U11 is the black pattern in the barrier structure, the extension direction of the stereoscopic unit U11 (for example, the direction D1) may be defined by an extension direction of one side (for example, a long side) of the black pattern in the barrier structure. When the stereoscopic unit U11 is the electrode for driving the liquid crystal molecules in the active stereoscopic structure, the extension direction of the stereoscopic unit U11 (for example, the direction D1) may be defined by an extension direction of one side (for example, a long side) of the electrode pattern 1120 in the active stereoscopic structure. It should be noted that in FIG. 7B, there is no contact between adjacent lenses 116, but in some embodiments, the adjacent lenses 116 may be at least partially in contact. In addition, for ease of explanation, in the drawings, the extension direction of the stereoscopic unit U11 (for example, the direction D1) is parallel to the direction DY, but the disclosure is not limited thereto. In some embodiments, the extension direction of the stereoscopic unit U11 (for example, the direction D1) may not be parallel to the direction DY.

The light control structure 12 is disposed on the display panel 10 and is disposed, for example, between the display panel 10 and the stereoscopic structure 11. The light control structure 12 may be used to limit an angle or a transmission direction of a light beam, so as to reduce the light reflection on a windshield when the display panel 10 is used, for example, in a car or improve the issue of overlapped left and right eye images. Through disposing the light control structure 12 adjacent to the display panel 10, the formation of overlapped images may be reduced to improve the quality of a stereoscopic image.

In addition, through disposing the light control structure 12 between the display panel 10 and the stereoscopic structure 11, the stereoscopic structure 11 and the display panel 10 may be kept at an appropriate distance, which facilitates the formation of the stereoscopic image. For example, as shown in FIG. 1C, the substrate 110 has a second top surface ST2, wherein a distance between the first top surface ST1 and the second top surface ST2 is d1, a pitch of the pixels 102 is P, and d1 may, for example, satisfy: 7P<d1<16P to facilitate the formation of the stereoscopic image. The pitch P of the pixel 102 is measured under top views (refer to FIG. 8A to FIG. 8C). The measurement manner may be to measure a shortest distance from one side or one endpoint of a subpixel with a color of the pixel 102 to a corresponding side or a corresponding endpoint of a subpixel with the same color at a corresponding position in the adjacent pixel 102 arranged along a direction along the arrangement direction. Taking FIG. 8A as an example, it is assumed that one pixel 102 includes the red subpixel PR, the green subpixel PG, and the blue subpixel PB, the red subpixel PR, the green subpixel PG, and the blue subpixel PB are arranged along the direction DX, and there is another pixel adjacent to the pixel 102 in the direction DX. The pitch P of the pixel 102 may be a distance from an upper left endpoint of the blue subpixel PB of the pixel 102 to the upper left endpoint of the blue subpixel PB of the adjacent pixel in the direction DX. In addition, taking FIG. 8B as an example, as shown in FIG. 8B, there is at least one red subpixel PR in a pixel 102A, and there is also the red subpixel PR located at a corresponding position in an adjacent pixel 102B arranged in the direction DX. At this time, the pitch P of the pixel 102A may be a distance from a left endpoint of the red subpixel PR of the pixel 102A to a left endpoint of the red subpixel PR of the pixel 102B in the direction DX. As for the embodiment shown in FIG. 8C, there is at least one blue subpixel PB in the pixel 102A, and there is also the blue subpixel PB located at a corresponding position in the adjacent pixel 102B arranged in the direction DX. At this time, the pitch P may be a shortest distance from a left side of the blue subpixel PB in the pixel 102A to a left side of the blue subpixel PB located at the corresponding position in the pixel 102B in the direction DX.

It can be derived from geometrical optics that d1=K*P, where K=(d2*n)/e. d2 is a distance between a bottom surface SB (refer to FIG. 1C) of the substrate 111 and the (not shown) eyes of the user in a normal direction (for example, the direction DZ) of the display panel 10. The distance d2 is related to the age, eye diopters, usage habits, etc. of the user. For example, adults have a greater distance d2 than infants and children, and presbyopia has a greater distance d2 than myopia (in the case of uncorrected vision). Generally speaking, the distance d2 is approximately between 300 mm and 650 mm. A refractive index n may be a refractive index of a light ray after being emitted from the display device 1 and encountering a non-air (the refractive index of air is approximately equal to 1) light transmitting medium (for example, a transparent cover located in front of the display device). Taking a glass cover as an example, n is approximately 1.52. e is a distance between the eyes of the user. Generally speaking, e is approximately between 60 mm and 63 mm. It can be obtained through calculation that 7P<d1<16P. In other words, through setting d1 to be within a range of 7P to 16P, the stereoscopic image seen by the user can have better quality.

The light control structure 12 may include multiple light control units U12, and the light control units U12 extend in the direction D2. The light control units U12 are repetitive units in the light control structure 12. For example, as shown in FIG. 1C, the light control structure 12 may include a light transmitting layer 120 and multiple light shielding patterns embedded in the light transmitting layer 120, wherein the light control units U12 may be multiple light shielding patterns in the light control structure 12. The light control unit U12 extends toward the direction D2, which may be defined by an extension direction of one side (for example, a long side) of the light shielding pattern. The direction D2 is different from the direction D1.

In some embodiments, although not shown, the manufacturing method of the light control structure 12 may include, but is not limited to: forming a light transmitting material on the insulating layer 104; embossing the light transmitting material through an embossing mold to form multiple grooves; curing (for example, thermal curing or light curing, and light curing may include, but is not limited to, ultraviolet light curing) the light transmitting material to form the light transmitting layer 120; separating the embossing mold from the light transmitting layer 120; and forming an opaque material in the grooves of the transparent layer 120 to form the light control units U12. The light transmitting material may include acrylate resin, polycarbonate resin, polyurethane resin, polyimide resin, or epoxy resin, but not limited thereto. The opaque material may include black resin, gray resin, white resin, or metal, but not limited thereto.

An included angle θ between the direction D1 in which the stereoscopic unit U11 extends and the direction D2 in which the light control unit U12 extends is an angle measured in a clockwise direction to the direction D2 in which the light control unit U12 extends based on the direction D1 in which the stereoscopic unit U11 extends in the top views. If the display device 1 is curved, the included angle between the two extension directions measured when the display device 1 is flat (non-curved state) is used as the included angle θ. In some embodiments, the included angle θ may be greater than 0 degrees and less than 180 degrees (0 degrees<θ<180 degrees). In other words, the direction D1 is not parallel to the direction D2. Through designing the extension directions to be not parallel, the probability of moiré pattern generated due to the direction D1 in which the stereoscopic unit U11 extends being parallel to the direction D2 in which the light control unit U12 extends can be reduced.

In some embodiments, the direction D1 in which the stereoscopic units U11 extend may be parallel to the direction DY and perpendicular to the direction DX and the normal direction (for example, the direction DZ) of the display panel 10, but not limited thereto. In some embodiments, the direction D2 in which the light control units U12 extend is not parallel and not perpendicular to the direction DY (the direction DY is parallel to the direction D1 in the drawings) and the direction DX but is perpendicular to the normal direction (for example, the direction DZ). When the display device 1 is used in a vehicle, the design of the light control units U12 extending close to a lateral direction is adopted to block a large-angle light beam in the direction DY, thereby reducing the reflection of the display panel 10 on the windshield. For example, the included angle θ may be greater than or equal to 45 degrees and less than or equal to 135 degrees (45 degrees≤θ≤135 degrees), or the included angle θ may be greater than or equal to 64 degrees and less than or equal to 116 degrees (64 degrees≤θ≤116 degrees), but not limited thereto.

Figure 3A:
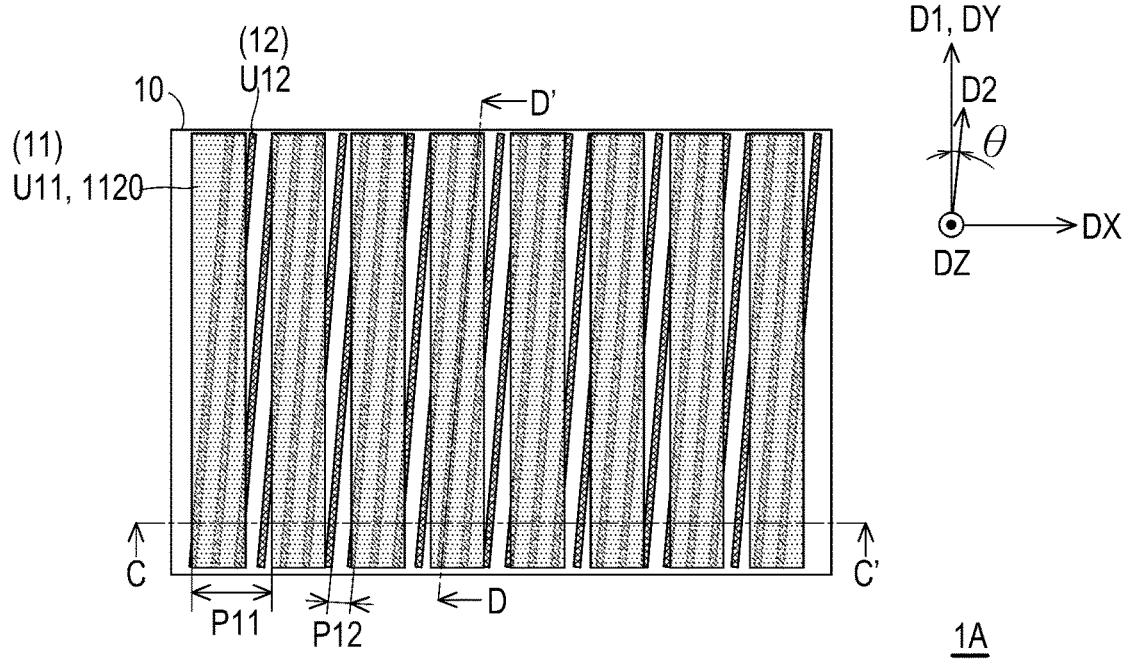
FIG. 3A is a top schematic view of a display device according to some embodiments of the disclosure.
Figure 3B:
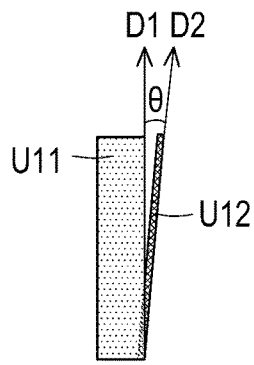
FIG. 3B is a partial schematic view of a stereoscopic unit and a light control unit in FIG. 3A.
Figure 3C:
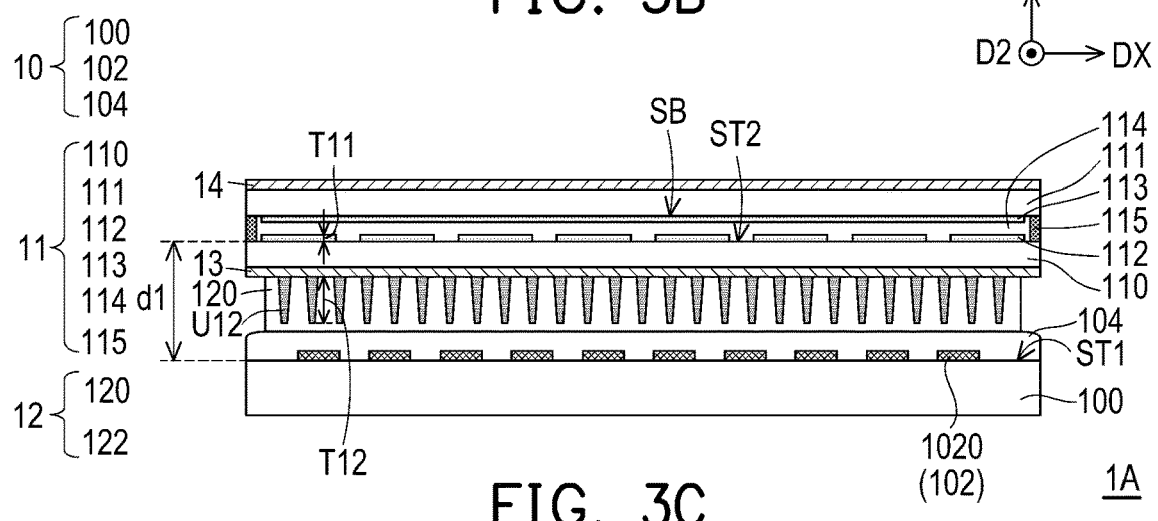
FIG. 3C and FIG. 3D are respectively cross-sectional schematic views taken along a section line C-C' and a section line D-D' in FIG. 3A.
Figure 3D:
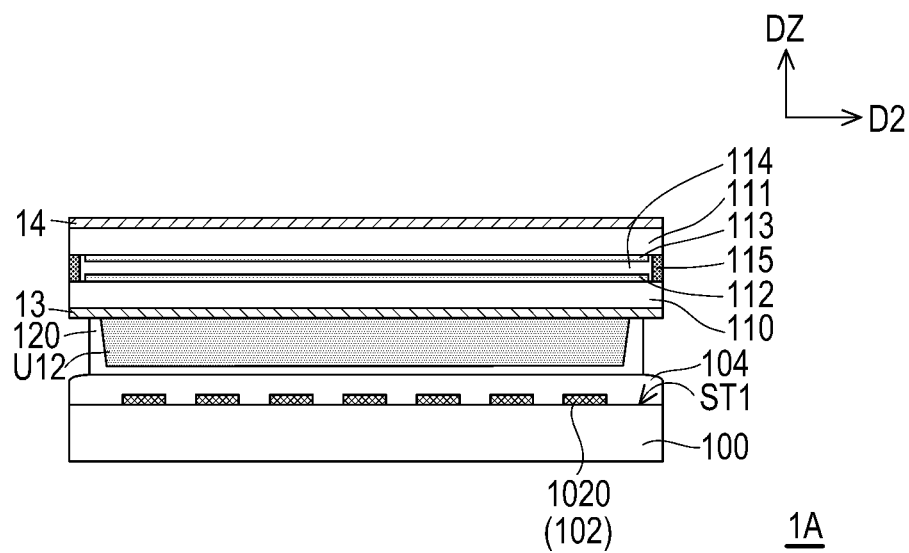

In some embodiments, as shown in FIG. 1A, the stereoscopic units U11 may have a pitch greater than the light control units U12, that is, a pitch P11 of the stereoscopic units U11 is greater than a pitch P12 of the light control units U12. The pitch may be measured under the top view (as shown in FIG. 1A), and the measurement manner is to measure from one side of a unit to the same side of an adjacent unit. For example, as shown in FIG. 3A, the pitch P11 may be a shortest distance between a right side of the stereoscopic unit U11 and a right side of another adjacent stereoscopic unit U11, and the pitch P12 may be a shortest distance between a right side of the light control unit U12 and a right side of another adjacent light control unit U12. Through designing the pitch P12 of the light control unit U12 to be less than the pitch P11 of the stereoscopic unit U11, the light shielding effect of the light control structure 12 can be improved, which further reduces the reflection of the display panel 10 on the windshield. In some embodiments, the pitch P11 is approximately 40 μm to 45 μm (40 μm≤P11≤45 μm), but not limited thereto.

In some embodiments, as shown in FIG. 1C, the stereoscopic unit U11 may have a thickness less than the light control unit U12, that is, a thickness T11 of the stereoscopic unit U11 is less than a thickness T12 of the light control unit U12. The thickness T11 of the stereoscopic unit U11 refers to a maximum value of the stereoscopic unit measured in the normal direction (for example, the direction DZ in FIG. 1C) of the substrate 100 in a cross-sectional view. Similarly, the thickness T12 of the light control unit U12 refers to a maximum value of the light control unit U12 measured in the direction DZ under a cross-sectional state. For example, in FIG. 1C, the stereoscopic structure 11 is the active stereoscopic structure, and the stereoscopic unit U11 is the electrode (for example, the electrode pattern 1120) for driving the liquid crystal molecules in the active stereoscopic structure. Therefore, the thickness T11 of the stereoscopic unit U11 is, for example, a maximum thickness of the electrode pattern 1120 in the electrode layer 112. On the other hand, in FIG. 1C, the thickness T12 of the light control unit U12 is, for example, a maximum thickness of the light shielding pattern. Through designing the thickness T12 of the light control unit U12 to be greater than the thickness T11 of the stereoscopic unit U11, the light shielding effect of the light control structure 12 can be improved, which further reduces the reflection of the display panel 10 on the windshield. In some embodiments, the thickness T12 is approximately 50 μm to 200 μm (50 μm≤T12≤200 μm), but not limited thereto.

Figure 1D:
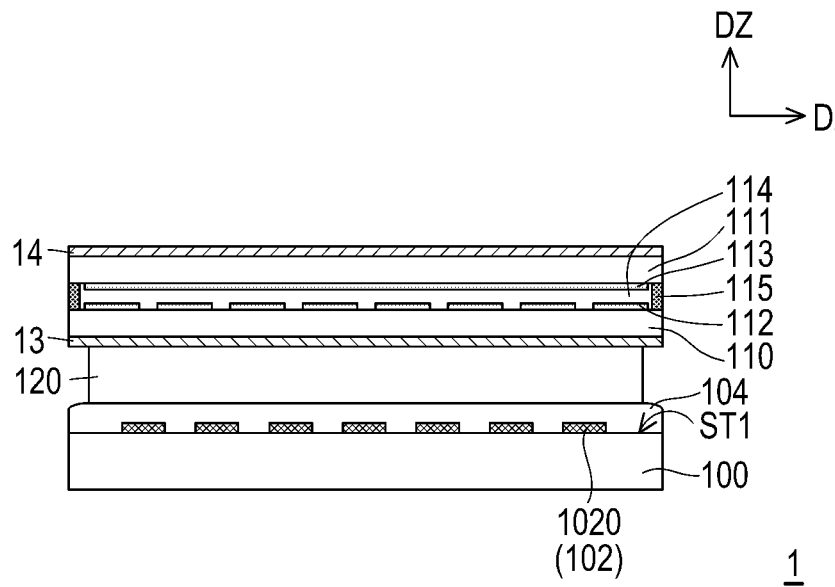

According to different requirements, the display device 1 may also include other elements or films. For example, as shown in FIG. 1C or FIG. 1D, the display device 1 may also include a polarizer 13 and a polarizer 14. The polarizer 13 is, for example, disposed between the light control structure 12 and the stereoscopic structure 11. The polarizer 14 is, for example, disposed on the substrate 111, and the substrate 111 is located between the electrode layer 113 and the polarizer 14. The polarizer 13 and the polarizer 14 may be linear polarizers, circular polarizers, or a combination of the above, but not limited thereto. For example, the polarizer 13 and the polarizer 14 are respectively a circular polarizer and a linear polarizer, but not limited thereto. In some embodiments, the display device 1 may also include a cover plate (not shown). The cover plate may be disposed on the polarizer 14 to protect the element or the film located thereunder. The cover plate may be a glass cover plate, a plastic cover plate, or a combination of the above, but not limited thereto.

Figure 2:
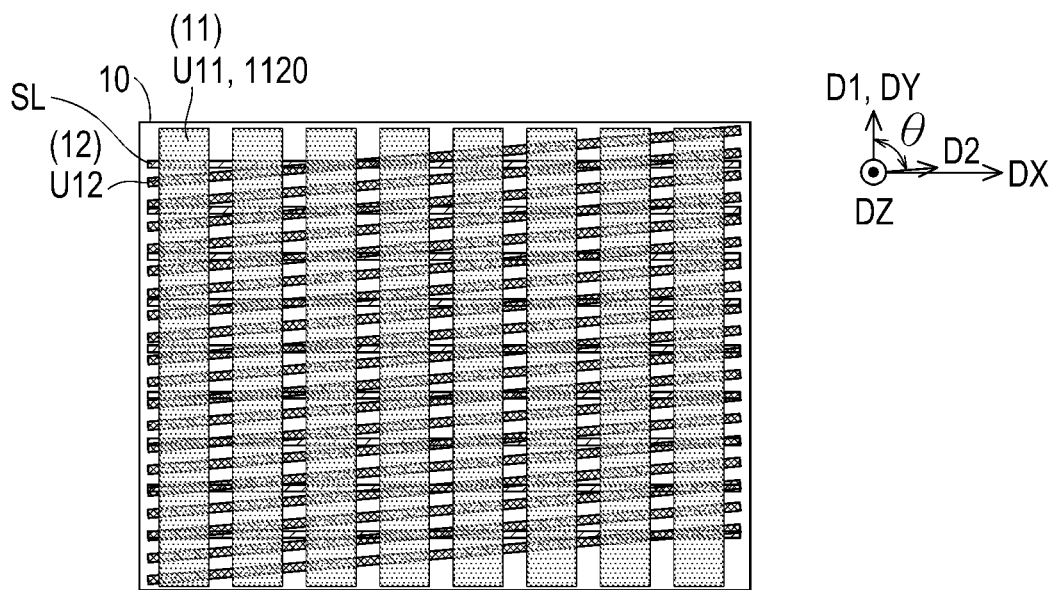
FIG. 2 is a top schematic view of a display device according to some embodiments of the disclosure.

Please refer to FIG. 2. In some embodiments, the display panel 10 may also include multiple scan lines SL. The scan lines SL are, for example, disposed on the driving substrate 100 in FIG. 1D and are used to couple the light emitting diodes 1020. The scan lines SL may, for example, extend in the direction DX and be arranged in the direction DY, so the extension direction of the light control units U12 and the extension direction of the scan lines SL are neither parallel nor perpendicular to each other. Through the design of the extension direction of the light control units U12 and the extension direction of the scan lines SL being not parallel to each other, the probability of moiré pattern generated due to the extension directions of the two being parallel can be reduced. Through the design of the light control units U12 and the scanning lines SL being not perpendicular to each other, the probability of light interference generated due to the extension directions being perpendicular can be reduced.

Please refer to FIG. 3A to FIG. 3D. As shown in FIG. 3A to FIG. 3D, the main difference between a display device 1A and the display device 1 of FIG. 1A to FIG. 1D is that the design of the light control units U12 extending close to a longitudinal direction is adopted. For example, the included angle θ between the direction D1 and the direction D2 may be greater than 0 degrees and less than or equal to 45 degrees (0 degrees<θ≤45 degrees), or the included angle θ may be greater than or equal to 135 degrees and less than 180 degrees (135 degrees≤θ<180 degrees). In some embodiments, the included angle θ may be greater than or equal to 8 degrees and less than or equal to 26 degrees (8 degrees≤θ≤26 degrees), or the included angle θ may be greater than or equal to 154 degrees and less than or equal to 172 degrees (154 degrees≤θ≤172 degrees). Through the design of the light control units U12 extending close to the longitudinal direction, a divergence angle of a light beam in the direction DX can be limited, thereby improving the issue of overlapped left and right eye images.

As mentioned above, in some embodiments, the display device 1A may satisfy: 7P<d1<16P to facilitate the formation of the stereoscopic image. In some embodiments, the display device 1A can improve the light shielding effect of the light control structure 12 through the design of the pitch (for example, the pitch P12) or the thickness (for example, the thickness T12) to further improve the issue of overlapped left and right eye images.

Figure 4:
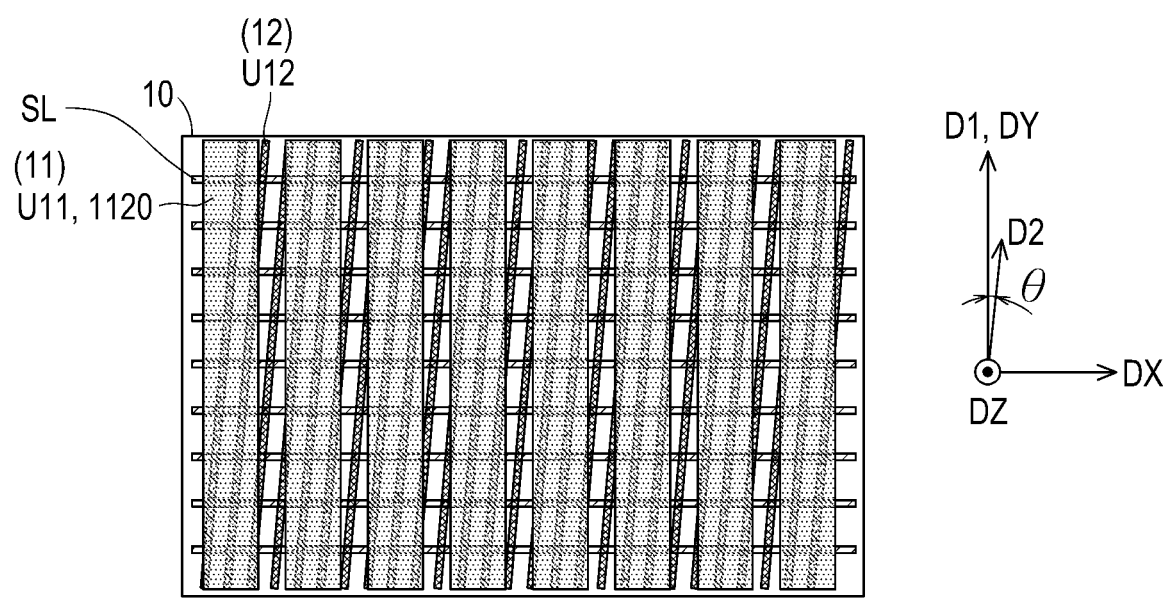
FIG. 4 is a top schematic view of a display device according to some embodiments of the disclosure.

Please refer to FIG. 4, which is another embodiment of the disclosure. The display panel 10 of FIG. 4 is similar to the display panel 10 of FIG. 3A, and the display panel 10 may also include the scan lines SL. The configuration of the scan lines SL may be the same as or similar to the embodiment shown in FIG. 2, so there will be no repetition here.

Figure 5A:
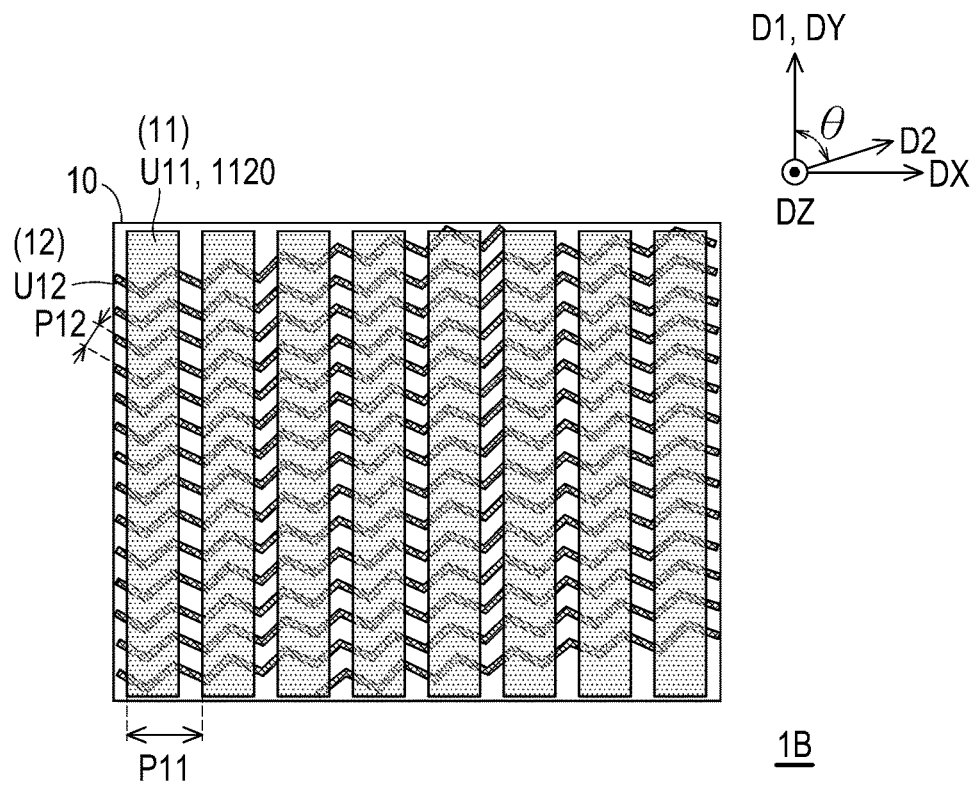
FIG. 5A is a top schematic view of a display device according to some embodiments of the disclosure.
Figure 5B:
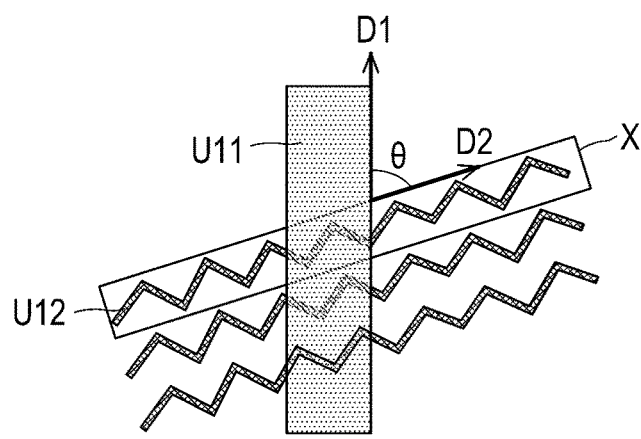
FIG. 5B is a partial enlarged schematic view of a stereoscopic unit and three light control units in FIG. 5A.

Please refer to FIG. 5A and FIG. 5B. The main difference between a display device 1B and the display device 1 of FIG. 1A to FIG. 1D is that at least one of the light control units U12 has a curved or wavy profile. FIG. 5A and FIG. 5B schematically show that all the light control units U12 have the curved profile, but the disclosure is not limited thereto. Through the design of the curved profile of the light control unit U12, the probability of moiré pattern generated due to regular arrangement can be further reduced.

As shown in FIG. 5B, under the architecture of the light control unit U12 having the curved profile, a long side of a smallest rectangle X surrounding one of the light control units U12 is defined as the extension direction D2 of the light control unit U12. Under the architecture of the light control unit U12 having the curved profile, the included angle θ between the direction D1 and the direction D2 may adopt any of the designs of the included angle mentioned above, which will not be repeated here. In some embodiments, the display device 1B may satisfy: 7P<d1<16P to facilitate the formation of the stereoscopic image. In some embodiments, the display device 1B can improve the light shielding effect of the light control structure 12 through the design of the pitch (for example, the pitch P12) or the thickness (not shown in FIG. 5A and FIG. 5B, please refer to the thickness T12 of FIG. 1C).

Figure 6A:
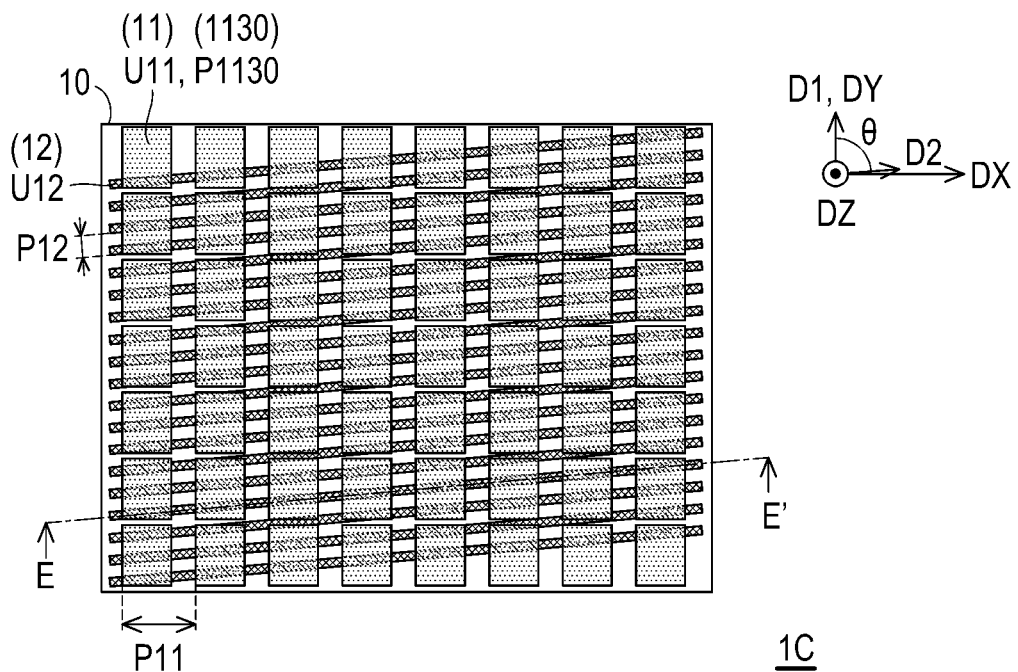
FIG. 6A is a top schematic view of a display device according to some embodiments of the disclosure.
Figure 6B:
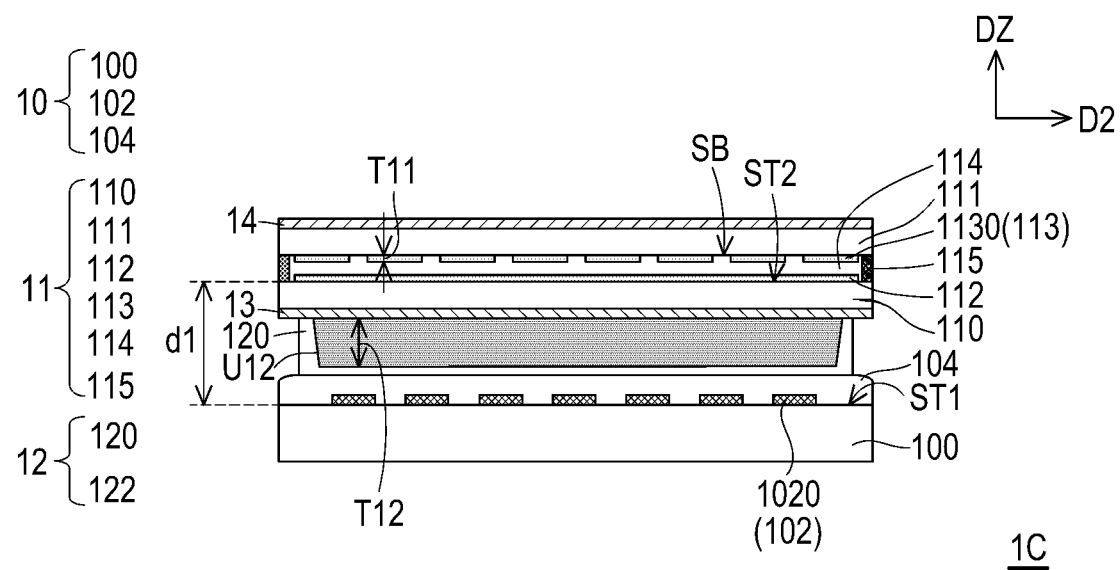
FIG. 6B is a cross-sectional schematic view taken along a section line E-E' in FIG. 6A.

Please refer to FIG. 6A and FIG. 6B. The main difference between a display device 1C and the display device 1 of FIG. 1A to FIG. 1D is that the electrode layer 112 is a full-surface electrode layer, and the electrode layer 113 is a patterned electrode layer and includes multiple electrode patterns 1130. Compared with the electrode pattern 1120 of FIG. 1A, the electrode pattern 1130 is broken into multiple portions P1130 in the direction D1. Under the architecture, the arrangement direction of the portions P1130 is used as the extension direction D1 of the stereoscopic unit U1f. The portions P1130 are electrically independent of one another and are disposed on the full-surface electrode layer (the electrode layer 112, for example, as the common electrode layer), so that the full-surface electrode layer may be prevented from shielding signals of the portions P1130. As such, at least a part of the portions P1130 may also be used as touch electrodes or antenna electrodes for near field communication (NFC), but not limited thereto.

When forming the stereoscopic image, the portions P1130 arranged in the direction D1 may receive the same signal, and two adjacent portions P1130 arranged in the direction DX may receive different signals. In this way, the stereoscopic structure 11 can achieve the effect similar to the barrier structure, but not limited thereto.

Under the architecture of FIG. 6A and FIG. 6B, the included angle θ between the direction D1 and the direction D2 may adopt any of the designs of the included angle mentioned above, which will not be repeated here. In some embodiments, the display device 1C may satisfy: 7P<d1<16P to facilitate the formation of the stereoscopic image. In some embodiments, the display device 1C can improve the light shielding effect of the light control structure 12 through the design of the pitch (for example, the pitch P12) or the thickness (for example, the thickness T12).

Figure 7A:
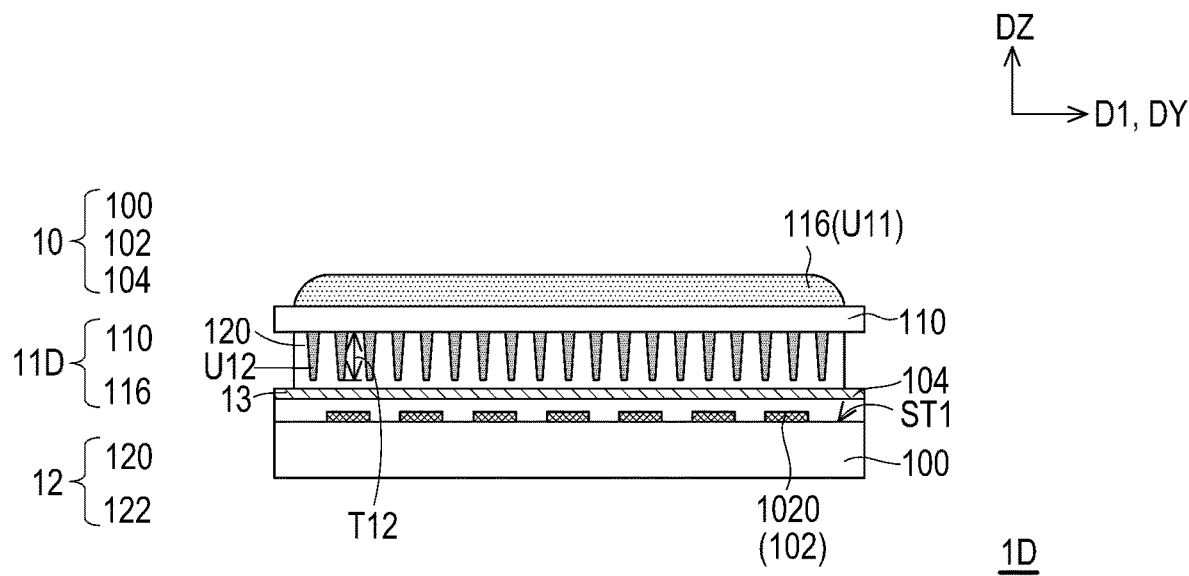
FIG. 7A and FIG. 7B are respectively cross-sectional schematic views taken along the section line A-A' and the section line B-B' in FIG. 1A.
Figure 7B:
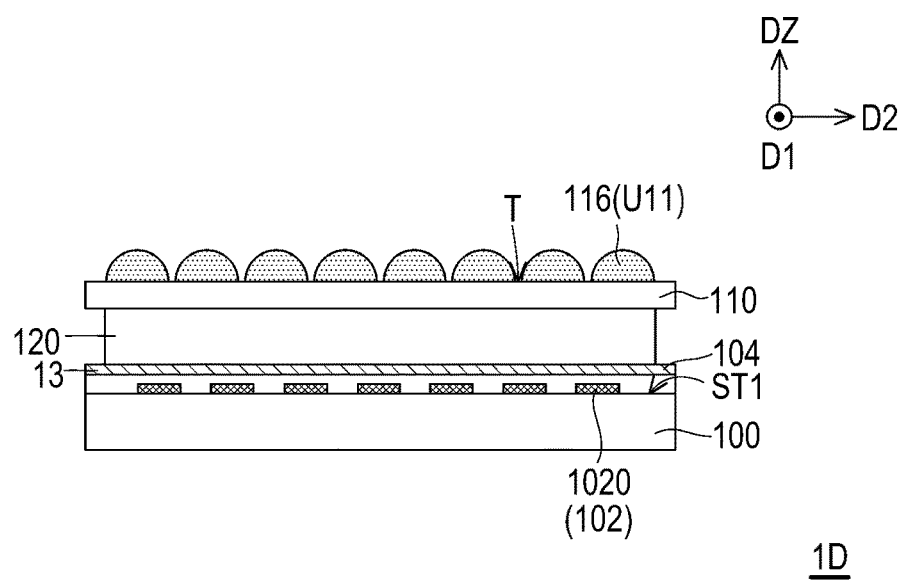

Please refer to FIG. 1A, FIG. 7A, and FIG. 7B. For the top view of a display device 1D, refer may be made to FIG. 1A and FIG. 1B, wherein the cross-sections shown in FIG. 7A and FIG. 7B respectively correspond to a section line A-A' and a section line B-B' in FIG. 1A. The main difference between the display device 1D and FIG. 1C and FIG. 1D is that a stereoscopic structure 11D is a passive stereoscopic structure, such as a lenticular structure, but not limited thereto. For example, the stereoscopic structure 11D may include the substrate 110 and the lenses 116 disposed on the substrate 110. Under the passive stereoscopic structure, the stereoscopic units U11 in FIG. 1A are the lenses 116 in the lenticular structure, and the extension direction of the stereoscopic unit U11 is, for example, defined by the extension direction of the trough T of the lens in the lenticular structure, but not limited thereto.

The display device 1D may include the polarizer 13 but not the polarizer 14 of FIG. 1C and FIG. 1D, but not limited thereto. The polarizer 13 may be disposed between the display panel 10 and the light control structure 12, but not limited thereto. The polarizer 13 may be a linear polarizer or a circular polarizer, but not limited thereto.

Under the architecture of FIG. 7A and FIG. 7B, the included angle θ (refer to FIG. 1B) between the direction D1 and the direction D2 may adopt any of the designs of the included angle mentioned above, which will not be repeated here. In some embodiments, the display device 1D may dispose the light control structure 12 between the display panel 10 and the stereoscopic structure 11D to facilitate the formation of the stereoscopic image. In some embodiments, the display device 1D can improve the light shielding effect of the light control structure 12 through the design of the pitch (for example, the pitch P12 of FIG. 1A) or the thickness (for example, the thickness T12).

On the other hand, although the display device is illustrated by using the automotive display device as an example, the display device of any embodiment of the disclosure is not limited to the automotive display device. For example, the display device of any embodiment of the disclosure may also be a general mobile device.

In summary, in the embodiments of the disclosure, the divergence angle or the transmission direction of the light beam is limited through the light control structure, so as to reduce the reflection of the display panel on the windshield or improve the issue of overlapped left and right eye images. In addition, through disposing the light control structure between the display panel and the stereoscopic structure, the formation of the stereoscopic image is facilitated. Through disposing the light control structure adjacent to the display panel, the formation of a ghost image or overlapped images is reduced to improve the quality of stereoscopic display.

The above embodiments are only used to illustrate, but not to limit, the technical solutions of the disclosure. Although the disclosure has been described in detail with reference to the above embodiments, persons skilled in the art should understand that they may still combine or modify the technical solutions described in the above embodiments or equivalently replace some or all of the technical features. However, the combinations, modifications, or replacements do not cause the essence of the corresponding technical solution to deviate from the scope of the technical solutions of the embodiments of the disclosure.

Although the embodiments of the disclosure and the advantages thereof have been disclosed as above, it should be understood that persons skilled in the art may make changes, substitutions, and modifications without departing from the spirit and scope of the disclosure, and the features between the embodiments may be arbitrarily mixed and replaced to form other new embodiments. In addition, the protection scope of the disclosure is not limited to the processes, machines, manufacturing, material composition, devices, methods, and steps in the specific embodiments described in the specification. Persons skilled in the art may understand from the content of the disclosure that the current or future-developed processes, machines, manufacturing, material composition, devices, methods, and steps may all be used according to the disclosure as long as they may implement substantially the same functions or obtain substantially the same results in the embodiments described herein. Therefore, the protection scope of the disclosure includes the processes, machines, manufacturing, material composition, devices, methods, and steps. In addition, each claim constitutes an individual embodiment, and the protection scope of the disclosure also includes the combination of each claim and embodiment. The protection scope of the disclosure shall be defined by the appended claims.

What is claimed is:

1. A display device, comprising:
   a display panel, comprising a driving substrate and a plurality of pixels disposed on the driving substrate;
   a stereoscopic structure, disposed on the display panel, wherein the stereoscopic structure comprises a plurality of stereoscopic units, and the plurality of stereoscopic units extend in a first direction; and
   a light control structure, disposed between the plurality of pixels and the stereoscopic structure, wherein the light control structure comprises a plurality of light control units, and the plurality of light control units extend in a second direction, wherein
   an included angle between the first direction and the second direction is greater than 0 degrees and less than 180 degrees.

2. The display device according to claim 1, wherein the included angle is greater than or equal to 45 degrees and less than or equal to 135 degrees.

3. The display device according to claim 2, wherein the included angle is greater than or equal to 64 degrees and less than or equal to 116 degrees.

4. The display device according to claim 1, wherein the included angle is greater than 0 degrees and less than or equal to 45 degrees, or the included angle is greater than or equal to 135 degrees and less than 180 degrees.

5. The display device according to claim 4, wherein the included angle is greater than or equal to 8 degrees and less than or equal to 26 degrees, or the included angle is greater than or equal to 154 degrees and less than or equal to 172 degrees.

6. The display device according to claim 1, wherein the plurality of stereoscopic units have a pitch greater than the plurality of light control units.

7. The display device according to claim 1, wherein the plurality of stereoscopic units have a thickness less than the plurality of light control units.

8. The display device according to claim 1, wherein the stereoscopic structure further comprises a plurality of liquid crystal molecules.

9. The display device according to claim 8, wherein the plurality of stereoscopic units are electrodes for driving the plurality of liquid crystal molecules.

10. The display device according to claim 1, wherein the plurality of stereoscopic units are lenses.

11. The display device according to claim 1, wherein the plurality of stereoscopic units are black patterns.

12. The display device according to claim 1, wherein at least one of the plurality of light control units has a curved profile.

13. The display device according to claim 1, wherein the driving substrate has a first top surface; and
wherein
the stereoscopic device further comprises:
a substrate, having a second top surface, wherein a distance between the first top surface and the second top surface is $d1$, a pitch of the plurality of pixels is P, and $7P<d1<16P$.

* * * * *

UNITED STATES PATENT AND TRADEMARK OFFICE
CERTIFICATE OF CORRECTION

| | |
|---|---|
| PATENT NO. | : 11,747,645 B2 |
| APPLICATION NO. | : 17/883617 |
| DATED | : September 5, 2023 |
| INVENTOR(S) | : Jui-Jen Yueh et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Fourteenth Day of November, 2023

Katherine Kelly Vidal
*Director of the United States Patent and Trademark Office*